April 21, 1964 J. D. ROUNTREE 3,129,709
TRAINING DEVICE
Filed March 29, 1961

INVENTOR:
JOSEPH D. ROUNTREE,
BY Kingsland, Rogers & Ezell
ATTORNEYS

United States Patent Office 3,129,709
Patented Apr. 21, 1964

3,129,709
TRAINING DEVICE
Joseph D. Rountree, 1906 St. Clair Ave.,
East St. Louis, Ill.
Filed Mar. 29, 1961, Ser. No. 99,102
3 Claims. (Cl. 128—360)

This invention relates to a training device and particularly to a pacifier or the like that is constructed to train young children to stop sucking on the pacifier.

In its broadest sense, the invention includes a pacifier body having a nipple projecting therefrom. The nipple is attached to a slide that is movably supported within the pacifier body and there is a screw threaded through the slide for withdrawing the slide and the nipple into the handle of the pacifier body when the screw is turned. When it is time to teach a child to stop sucking on the pacifier, the nipple may be withdrawn in stages, so that the child is gradually taught that it is increasingly less desirable to suck on the pacifier.

The conventional pacifier has been a considerable aid in soothing small children and babies to keep them from crying. There arrives a time, however, when babies should not longer use a pacifier, but often the baby will not voluntarily leave the pacifier alone. Attempts to take the pacifier away from the baby often result in frustration and tantrums in the baby that are, at least, disquieting.

It is an object of this invention to provide a training device to teach a baby to stop using the pacifier.

Specifically, one object is to provide a pacifier that normally acts as a pacifier to sooth a baby's nerves but that includes means for retracting the nipple of the pacifier to gradually teach the baby to stop using the pacifier.

Another object of the invention is to provide a training device that teaches a baby not to suck on a pacifier and so discourages the baby that he does not later suck on his thumb.

Yet another object of the invention is to provide a pacifier having a handle with a slidable sleeve supported by the pacifier handle, a nipple attached to the sleeve, and a screw for withdrawing the sleeve and the nipple into the handle of the pacifier.

Still another object of the invention is to provide a training device in the form of a pacifier or the like that includes a pacifier body with a nipple supported by the pacifier body and with means for withdrawing the nipple into the pacifier body, which means are not readily obvious or accessible to a baby or young child.

Other objects and advantages will be apparent to those skilled in the art.

Figure 1:
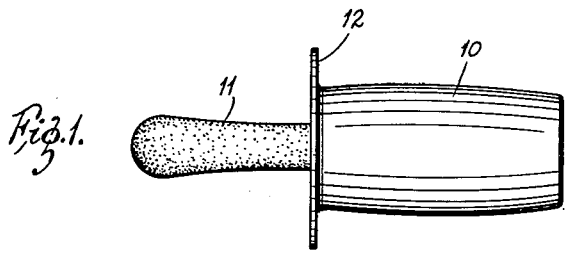
FIGURE 1 is a typical side elevation view of the pacifier of this invention.
Figure 2:
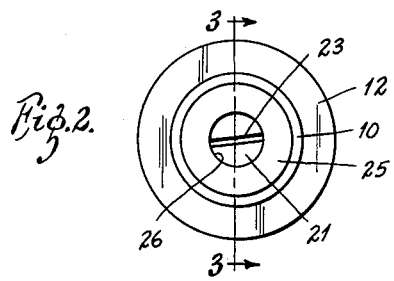
FIGURE 2 is a front elevation view of the pacifier.
Figure 3:
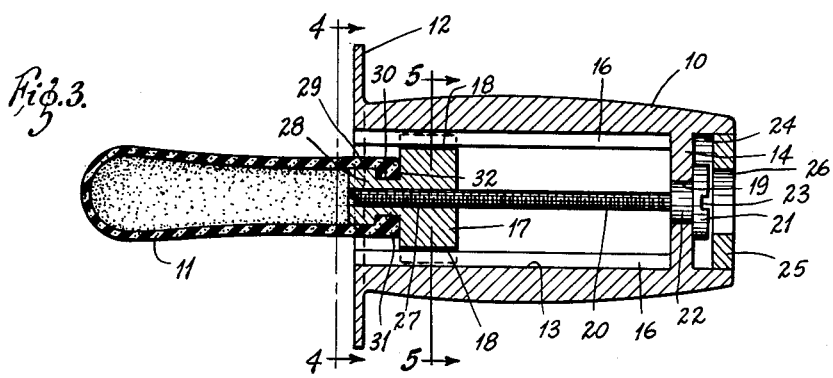
FIGURE 3 is a sectional view on an enlarged scale taken along the line 3—3 of FIGURE 2.
Figures 4, 5:
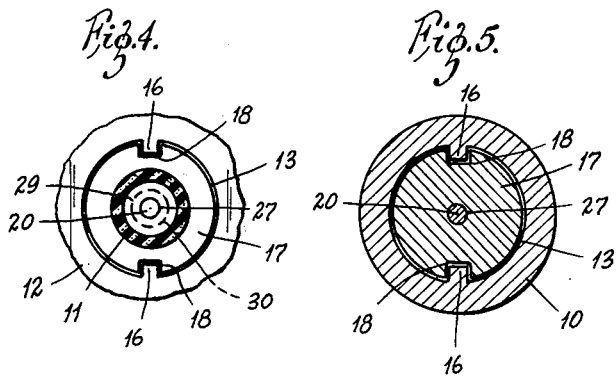
FIGURE 4 is a view partly in section taken along the line 4—4 of FIGURE 3.
FIGURE 5 is a view in section taken along the line 5—5 of FIGURE 3.

Referring to the drawings, the pacifier has a handle 10 that supports a nipple 11. There is a disc-like guard plate 12 at the forward end of the handle 10 with a cylindrical recess 13 that extends from the guard plate and most of the way through the handle. The end of the recess 13 is defined by a screw stop 14 near, but spaced from, the rear end of the handle 10.

A pair of oppositely disposed longitudinal guide ribs 16 depend inwardly from the side wall of the recess 13. These ribs 16 extend from the forward end of the body 10 to the screw stop 14. A slide 17 has a pair of longitudinal peripheral notches 18 for sealing the guide ribs 16. The slide 17 is movable back and forth within the recess 13, but is prevented by the guide ribs 16 from rotating.

The screw stop 14 has a hole 19 through it and a retractor screw 20 extends through the hole 19. The screw 20 has a screwhead 21 that will not fit through the hole 19 and a bearing shoulder 22 adjacent the screwhead 21 that rotatably fits within the hole 19 to prevent lateral wobbling of the screw 20. The screwhead 21 has a kerf 23 so that the screw can be rotated by a screw driver.

The handle 10 has another recess 24 that extends inwardly from the rear end and terminates the screw stop 14. The recess 24 rearward of the screw stop 14 is of greater depth than the height of the screw head 21, so that it can receive a screw retainer insert 25. The screw retainer insert 25 is cemented or otherwise fixed within the rearward portion of the recess 24. The screw retainer insert 25 has a hole 26 through it for accommodating the end of a screw driver, but the hole 26 is of smaller diameter than the diameter of the screwhead 21. Therefore, the screwhead 21 is blocked in one direction by the screw stop 14 and in the other direction by the screw retainer insert 25 against more than slight longitudinal displacement.

The slide 17 has a tapped hole 27 through it into which the screw 20 is threaded. Consequently, a rotation of the screw 20 causes the slide 17 to be withdrawn into the recess 13 or extended forwardly according to the direction of rotation of the screw 20. The slide 17 has a projection 28 extending forwardly with an enlarged cylindrical shaped forward end 29. An annular groove 30 is defined between the enlarged end 29 of the projection and the body of the slide.

The nipple 11 is hollow with an open rear end having an inwardly depending annular bead 32. The nipple 11 is formed of a resilient rubber or plastic material and is attached to the slide 17 by flexing the rear end 31 and snapping the bead 32 into the groove 30. The enlarged head 29 on the forward end of the projection 28 is then positioned within the hollow nipple 12 and establishes the shape of the rear end of the nipple.

The operation of this pacifier training device is simple enough to be understood by the housewife. When a screw driver is inserted through the opening 26 in the screw retainer insert 25 and the screw 20 is thereby rotated in a clockwise direction, the screw 20 rotates relative to the slide 17. The slide 17 is prevented from rotating by the projection of the guide ribs 16 within the grooves 18 of the slide 17. Rotation of the screw 20 therefore draws the slide 17 rearwardly as the slide 17 is guided by the longitudinal ribs 16. As the slide 17 moves rearwardly within the recess 13, it draws the nipple 11 further into the recess 13. Thus, by the simple rotation of the screw 20, the extent of projection of the nipple 11 beyond the guard plate 15 of the body 10, is controlled.

When a baby is to be trained to stop using the pacifier, the nipple is initially partly withdrawn into the handle 10. After the baby becomes accustomed to the shorter length nipple, the nipple is withdrawn further. The procedure is continued in stages until the baby becomes completely discouraged about using the pacifier. Yet, his discouragement is so gradual that the baby himself becomes convinced that the pacifier is no longer desirable. Hence, the trauma of a sudden change is absent.

One of the advantages of this invention is its few number of parts and ease of assembly. The handle 10, the screw stop 14 and the guard plate 15 may be molded as a single part, or as three separate parts that are later cemented together. Before the screw retainer insert 25 is fastened to the body, the screw 20 is inserted through the hole 19 in the screw stop 14. After the nipple 11 is snapped onto the projection 28 of the slide 17, the slide 17 is positioned with the tapped hole 27 opposite the end of the screw 20. The screw 20 is then rotated to thread the slide 17 onto the screw and draw it part of the way into the recess 13. Thereafter, the screw retainer insert 25 is cemented to the handle 10 and the pacifier is ready for use.

The invention describes a training device embodied in a pacifier. It should be apparent to those skilled in the art that the principles of the invention could also be adapted to provide a retractive nipple for a milk bottle or to other applications and that the invention is limited only by such variations and modifications of the attendant claims that are beyond the ability of those skilled in the art.

What is claimed is:

1. A training device comprising a sleeve having a recess in it, a slide movable axially within the recess in the sleeve, a nipple attached to the slide and extending therefrom substantially parallel to the axis of the sleeve, the depth of the recess being at least as great as the combined lengths of the nipple and slide measured axially of the recess, and means for moving the slide to move the nipple between positions of extension and retraction relative to the sleeve.

2. A training device comprising a hollow sleeve, a slide movable axially within the sleeve, a nipple attached to the slide and extending therefrom substantially parallel to the axis of the sleeve, and means for moving the slide to move the nipple between positions of extension and retraction relative to the sleeve, the moving means comprising a screw mounted on the sleeve and threaded into the slide, means to prevent relative rotation between the slide and the sleeve, whereby rotation of the screw moves the slide relative to the sleeve.

3. The training device of claim 2 wherein the screw is wholly contained within the sleeve and the nipple, with a recess in a side of the slide to provide access to head of the screw.

References Cited in the file of this patent

UNITED STATES PATENTS

| | | |
|---|---|---|
| 1,467,904 | McOmish | Sept. 11, 1923 |
| 2,195,472 | Szucs et al. | Apr. 2, 1940 |
| 2,545,444 | Braselton | Mar. 20, 1951 |

FOREIGN PATENTS

| | | |
|---|---|---|
| 32,777 | Switzerland | Dec. 8, 1904 |